United States Patent
Xu et al.

(10) Patent No.: US 9,877,244 B2
(45) Date of Patent: Jan. 23, 2018

(54) INTER-FREQUENCY NEIGHBORING CELL PROXIMITY DETECTION METHOD, INTER-FREQUENCY NEIGHBORING CELL MEASUREMENT METHOD, RADIO NETWORK CONTROLLER, AND USER EQUIPMENT

(71) Applicant: Huawei Technologies Co., Ltd., Shenzhen (CN)

(72) Inventors: Xiaoying Xu, Shanghai (CN); Dong Chen, Shanghai (CN); Li Feng, Xi'an (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 99 days.

(21) Appl. No.: 14/806,397

(22) Filed: Jul. 22, 2015

(65) Prior Publication Data
US 2015/0327134 A1    Nov. 12, 2015

Related U.S. Application Data

(63) Continuation of application No. PCT/CN2013/070856, filed on Jan. 22, 2013.

(51) Int. Cl.
*H04W 36/00* (2009.01)
*H04W 36/30* (2009.01)
(Continued)

(52) U.S. Cl.
CPC ... *H04W 36/0094* (2013.01); *H04W 36/0088* (2013.01); *H04W 36/04* (2013.01);
(Continued)

(58) Field of Classification Search
CPC ..... H04W 36/30; H04W 36/18; H04W 36/12; H04W 16/14; H04W 88/06; H04W 72/04; H04W 76/02; H04W 36/00
(Continued)

(56) References Cited

U.S. PATENT DOCUMENTS 8,243,665 B2 *  8/2012  Lee ................. H04W 28/20
                                                    370/329
2002/0187784 A1 * 12/2002 Tigerstedt ......... H04W 36/0088
                                                    455/439
(Continued)

FOREIGN PATENT DOCUMENTS

CN       1764315      4/2006
CN     101827412     9/2010
(Continued)

OTHER PUBLICATIONS

3GPP, "3rd Generation Partnership Project; Technical Specification Group Radio Access Network; Radio Resource Control (RRC); Protocol Specification (Release 11)," 3GPP TS 25.331 v11.4.0, Dec. 2012, 2056 pages.

*Primary Examiner* — Dai A Phuong
(74) *Attorney, Agent, or Firm* — Slater Matsil, LLP

(57) ABSTRACT

The present invention provides an inter-frequency neighboring cell proximity detection method, an inter-frequency neighboring cell measurement method, a radio network controller, and user equipment. In this method, a signal of an intra-frequency cell of a current serving cell of a user equipment is measured, a measurement result is compared with proximity detection information of an inter-frequency neighboring cell, and reporting may be performed when the information is met.

14 Claims, 7 Drawing Sheets

(51) Int. Cl.
*H04W 36/04* (2009.01)
*H04W 88/02* (2009.01)
*H04W 88/12* (2009.01)

(52) U.S. Cl.
CPC ........ *H04W 36/30* (2013.01); *H04W 36/0061* (2013.01); *H04W 88/02* (2013.01); *H04W 88/12* (2013.01)

(58) Field of Classification Search
USPC .... 455/432.1–435.1, 436–453, 456.1–456.3; 370/331–334
See application file for complete search history.

(56) References Cited

U.S. PATENT DOCUMENTS

| | | | | |
|---|---|---|---|---|
| 2007/0259618 | A1* | 11/2007 | Nomine-Beguin | H04B 7/18508 455/12.1 |
| 2009/0203381 | A1* | 8/2009 | Ueda | H04W 36/0061 455/439 |
| 2010/0323633 | A1* | 12/2010 | Pani | H04W 24/10 455/67.14 |
| 2011/0170481 | A1 | 7/2011 | Gomes et al. | |
| 2011/0217952 | A1* | 9/2011 | Nordstrand | H04W 36/0038 455/411 |
| 2012/0064873 | A1* | 3/2012 | Farnsworth | H04W 24/10 455/418 |
| 2012/0307670 | A1* | 12/2012 | Kazmi | H04W 24/10 370/252 |
| 2013/0077601 | A1* | 3/2013 | Chin | H04W 28/06 370/335 |
| 2013/0079049 | A1* | 3/2013 | Yu | H04W 48/16 455/524 |
| 2013/0190012 | A1* | 7/2013 | Suzuki | H04W 36/04 455/456.1 |
| 2014/0004862 | A1* | 1/2014 | Ekemark | H04W 72/06 455/443 |
| 2014/0155081 | A1* | 6/2014 | Nuss | H04W 28/08 455/453 |
| 2014/0206355 | A1* | 7/2014 | Pani | H04W 36/30 455/436 |
| 2015/0003311 | A1* | 1/2015 | Feuersaenger | H04W 52/0225 370/311 |
| 2015/0141047 | A1* | 5/2015 | Siomina | H04W 24/10 455/456.1 |
| 2015/0245262 | A1* | 8/2015 | Marinier | H04W 36/22 370/331 |
| 2015/0257025 | A1* | 9/2015 | Sagfors | H04W 36/0083 455/67.11 |

FOREIGN PATENT DOCUMENTS

| | | |
|---|---|---|
| CN | 102014422 A | 4/2011 |
| CN | 102869025 | 1/2013 |
| WO | WO 2011/110566 * | 9/2011 |
| WO | 2011121175 A1 | 10/2011 |

* cited by examiner

INTER-FREQUENCY NEIGHBORING CELL PROXIMITY DETECTION METHOD, INTER-FREQUENCY NEIGHBORING CELL MEASUREMENT METHOD, RADIO NETWORK CONTROLLER, AND USER EQUIPMENT

This application is a continuation of International Application No. PCT/CN2013/070856, filed on Jan. 22, 2013, which is hereby incorporated by reference in its entirety.

TECHNICAL FIELD

The present invention relates to the field of communications technologies, and in particular, to an inter-frequency neighboring cell proximity detection method, an inter-frequency neighboring cell measurement method, a radio network controller, and user equipment.

BACKGROUND

Wireless communications has entered a period of explosive growth of data services, and an operator faces the pressure of both "providing a higher network capacity" and "reducing transmission costs per bit". A heterogeneous network (Hetnet) is a network made up of cells of different sizes and different types, such as a macro cell, a micro cell, a pico cell, a femto cell, and a cell in a form of remote radio. By deploying a macro cell and a micro-type cell, ten times as many as a system capacity can be provided for an area with dense traffic. In an inter-frequency heterogeneous network, by deploying a small quantity of inter-frequency micro cells, considerable capacity and throughput gains can be obtained, and there is no interference problem compared with an intra-frequency deployment scenario.

In the prior art, in an inter-frequency heterogeneous network, for user equipment (UE) that depends on an inter-frequency compressed mode for inter-frequency measurement, a compressed mode may be enabled to perform measurement, to discover an inter-frequency neighboring cell; after discovering that the UE is in proximity to a micro cell, the UE reports the discovery to a network side, the network side then delivers a list of inter-frequency micro cells and a configuration of the inter-frequency compressed mode to the UE, and the UE measures the inter-frequency micro cells according to the list of inter-frequency micro cells and configuration information of the inter-frequency compressed mode.

However, in the foregoing method, the UE needs to always enable the inter-frequency compressed mode to measure an inter-frequency cell, so as to discover that the UE is in proximity to an inter-frequency neighboring cell, which causes that the UE consumes much power and data transmission performance is affected.

SUMMARY

Embodiments of the present invention provide an inter-frequency neighboring cell proximity detection method, an inter-frequency neighboring cell measurement method, a radio network controller, and user equipment, so as to resolve the defect of inter-frequency detection in the prior art.

According to a first aspect, an embodiment of the present invention provides a method for detecting proximity of an inter-frequency neighboring cell, including receiving, by user equipment, proximity detection information of an inter-frequency neighboring cell sent by a radio network controller, where the proximity detection information of the inter-frequency neighboring cell is used to indicate standard information of a signal measurement report of an intra-frequency cell; performing, by the user equipment, signal measurement on the intra-frequency cell; and if signal quality of the intra-frequency cell meets the standard information of the signal measurement report of the intra-frequency cell, reporting, by the user equipment, an indication message to the radio network controller, where the indication message is used to indicate that the user equipment is in proximity to the inter-frequency neighboring cell.

In a first possible implementation manner of the first aspect, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

According to the first aspect or the first possible implementation manner of the first aspect, in a second possible implementation manner, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

According to a second aspect, an embodiment of the present invention provides a method for detecting proximity of an inter-frequency neighboring cell, including sending, by a radio network controller, proximity detection information of an inter-frequency neighboring cell to user equipment, where the proximity detection information of the inter-frequency neighboring cell is used to indicate standard information of a signal measurement report of an intra-frequency cell, so that the user equipment performs signal measurement on the intra-frequency cell; and receiving, by the radio network controller, an indication message sent by the user equipment when signal quality of the intra-frequency cell meets the standard information of the signal measurement report of the intra-frequency cell, where the indication message is used to indicate that the user equipment is in proximity to the inter-frequency neighboring cell.

In a first possible implementation manner of the second aspect, the standard information of the signal measurement report of the intra-frequency cell includes at least one piece of the following information threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

According to the second aspect or the first possible implementation manner of the second aspect, in a second possible implementation manner, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

According to a third aspect, an embodiment of the present invention provides a method for measuring an inter-frequency neighboring cell, including sending, by user equipment, instruction information for activating measurement in an inter-frequency compressed mode to a radio network controller, where the instruction information for activating measurement in an inter-frequency compressed mode is used to instruct the radio network controller to activate a configuration of an inter-frequency compressed mode of a base station; performing, by the user equipment, measurement on an inter-frequency neighboring cell in a manner of measurement in an inter-frequency compressed mode; and reporting, by the user equipment, an inter-frequency measurement result to the radio network controller.

In a first possible implementation manner of the third aspect, when determining that signal quality of an intra-frequency cell meets standard information of a signal measurement report of the intra-frequency cell, the user equipment determines that the user equipment is in proximity to the inter-frequency neighboring cell; or when determining that signal quality of the inter-frequency neighboring cell at a current position of the user equipment falls within a preset range, the user equipment determines that the user equipment is in proximity to the inter-frequency neighboring cell; or when determining that a distance between a current position of the user equipment and a neighboring base station falls within a preset range, the user equipment determines that the user equipment is in proximity to the inter-frequency neighboring cell.

According to the third aspect or the first possible implementation manner of the third aspect, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

According to the third aspect or any one of the first to the second possible implementation manners of the third aspect, in a second possible implementation manner, before the sending, by user equipment, instruction information for activating measurement in an inter-frequency compressed mode to a radio network controller, the method further includes receiving, by the user equipment, configuration information that is of the inter-frequency compressed mode and sent by the radio network controller.

According to the third aspect or any one of the first to the third possible implementation manners of the third aspect, in a third possible implementation manner, after the sending, by user equipment, instruction information for activating measurement in an inter-frequency compressed mode to a radio network controller, the method further includes receiving, by the user equipment, a response message that is from the radio network controller and with respect to the instruction information for activating measurement in an inter-frequency compressed mode.

According to a fourth aspect, an embodiment of the present invention provides a method for measuring an inter-frequency neighboring cell, including receiving, by a radio network controller, instruction information that is sent by user equipment and for activating measurement in an inter-frequency compressed mode, where the instruction information for activating measurement in an inter-frequency compressed mode is used to instruct the radio network controller to activate a configuration of an inter-frequency compressed mode of a base station; activating, by the radio network controller, the configuration of the compressed mode of the base station according to the instruction information for activating measurement in an inter-frequency compressed mode; and receiving, by the radio network controller, an inter-frequency measurement result of measurement performed on an inter-frequency neighboring cell by the user equipment in a manner of measurement in an inter-frequency compressed mode.

In a first possible implementation manner of the fourth aspect, before the receiving, by a radio network controller, instruction information that is sent by user equipment and for activating measurement in an inter-frequency compressed mode, the method further includes sending, by the radio network controller, configuration information of the inter-frequency compressed mode to the user equipment.

According to the fourth aspect or the first possible implementation manner of the fourth aspect, in a second possible implementation manner, after the receiving, by a radio network controller, instruction information that is sent by user equipment and for activating measurement in an inter-frequency compressed mode, the method further includes sending, by the radio network controller, the user equipment a response message with respect to the instruction information for activating measurement in an inter-frequency compressed mode.

According to the fourth aspect or any one of the first to the second possible implementation manners of the fourth aspect, in a third possible implementation manner, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

According to a fifth aspect, an embodiment of the present invention provides user equipment, including a receiving module, configured to receive proximity detection information of an inter-frequency neighboring cell sent by a radio network controller, where the proximity detection information of the inter-frequency neighboring cell is used to indicate standard information of a signal measurement report of an intra-frequency cell; a measuring module, configured to perform signal measurement on the intra-frequency cell; and a sending module, configured to: when signal quality of the intra-frequency cell meets the standard information of the signal measurement report of the intra-frequency cell, report an indication message to the radio network controller, where the indication message is used to indicate that the user equipment is in proximity to the inter-frequency neighboring cell.

In a first possible implementation manner of the fifth aspect, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

According to the fifth aspect or the first possible implementation manner of the fifth aspect, in a second possible implementation manner, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

According to a sixth aspect, an embodiment of the present invention provides a radio network controller, including a sending module, configured to send proximity detection information of an inter-frequency neighboring cell to user equipment, where the proximity detection information of the inter-frequency neighboring cell is used to indicate standard information of a signal measurement report of an intra-frequency cell, so that the user equipment performs signal measurement on the intra-frequency cell; and a receiving module, configured to receive an indication message sent by the user equipment when signal quality of the intra-frequency cell meets the standard information of the signal measurement report of the intra-frequency cell, where the indication message is used to indicate that the user equipment is in proximity to the inter-frequency neighboring cell.

In a first possible implementation manner of the sixth aspect, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

According to the sixth aspect or the first possible implementation manner of the sixth aspect, in a second possible implementation manner, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

According to a seventh aspect, an embodiment of the present invention provides user equipment, including a sending module, configured to send instruction information for activating measurement in an inter-frequency compressed mode to a radio network controller, where the instruction information for activating measurement in an inter-frequency compressed mode is used to instruct the radio network controller to activate a configuration of an inter-frequency compressed mode of a base station; and a measuring module, configured to perform measurement on an inter-frequency neighboring cell in a manner of measurement in an inter-frequency compressed mode; where the sending module is further configured to report an inter-frequency measurement result to the radio network controller.

In a first possible implementation manner of the seventh aspect, the user equipment further includes: a determining module, configured to: when it is determined that signal quality of an intra-frequency cell meets standard information of a signal measurement report of the intra-frequency cell, determine that the user equipment is in proximity to the inter-frequency neighboring cell; or configured to: when it is determined that signal quality of the inter-frequency neighboring cell at a current position of the user equipment falls within a preset range, determine that the user equipment is in proximity to the inter-frequency neighboring cell; or configured to: when it is determined that a distance between a current position of the user equipment and a neighboring base station falls within a preset range, determine that the user equipment is in proximity to the inter-frequency neighboring cell.

According to the seventh aspect or the first possible implementation manner of the seventh aspect, in a second possible implementation manner, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

According to the seventh aspect or any one of the first to the second possible implementation manners of the seventh aspect, in a third possible implementation manner, the user equipment further includes: a receiving module, configured to receive configuration information that is of the inter-frequency compressed mode and sent by the radio network controller.

According to the seventh aspect or any one of the first to the third possible implementation manners of the seventh aspect, in a fourth possible implementation manner, the receiving module is further configured to receive a response message that is from the radio network controller and with respect to the instruction information for activating measurement in an inter-frequency compressed mode.

According to an eighth aspect, an embodiment of the present invention provides a radio network controller, including a receiving module, configured to receive instruction information that is sent by user equipment and for activating measurement in an inter-frequency compressed mode, where the instruction information for activating measurement in an inter-frequency compressed mode is used to instruct the radio network controller to activate a configuration of an inter-frequency compressed mode of a base station; and a processing module, configured to activate the configuration of the compressed mode according to the instruction information for activating measurement in an inter-frequency compressed mode; where the receiving module is further configured to receive an inter-frequency measurement result of measurement performed on an inter-frequency neighboring cell by the user equipment in a manner of measurement in an inter-frequency compressed mode.

In a first possible implementation manner of the eighth aspect, the radio network controller further includes a sending module, configured to send configuration information of the inter-frequency compressed mode to the user equipment.

According to the eighth aspect or the first possible implementation manner of the eighth aspect, in a second possible implementation manner, the sending module is further configured to send the user equipment a response message with respect to the instruction information for activating measurement in an inter-frequency compressed mode.

According to the eighth aspect or any one of the first to the second possible implementation manners of the eighth aspect, in a third possible implementation manner, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

According to a ninth aspect, an embodiment of the present invention provides user equipment, including a receiver, configured to receive proximity detection information of an inter-frequency neighboring cell sent by a radio network controller, where the proximity detection information of the inter-frequency neighboring cell is used to indicate standard information of a signal measurement report of an intra-frequency cell; a processor, configured to perform signal measurement on the intra-frequency cell; and a transmitter, configured to: when signal quality of the intra-frequency cell meets the standard information of the signal measurement report of the intra-frequency cell, report an indication message to the radio network controller, where the indication message is used to indicate that the user equipment is in proximity to the inter-frequency neighboring cell.

In a first possible implementation manner of the ninth aspect, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

According to the ninth aspect or the first possible implementation manner of the ninth aspect, in a second possible implementation manner, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

According to a tenth aspect, an embodiment of the present invention provides a radio network controller, including a transmitter, configured to send proximity detection information of an inter-frequency neighboring cell to user equipment, where the proximity detection information of the inter-frequency neighboring cell is used to indicate standard information of a signal measurement report of an intra-frequency cell, so that the user equipment performs signal measurement on the intra-frequency cell; and a receiver, configured to receive an indication message sent by the user equipment when signal quality of the intra-frequency cell meets the standard information of the signal measurement report of the intra-frequency cell, where the indication message is used to indicate that the user equipment is in proximity to the inter-frequency neighboring cell.

In a first possible implementation manner of the tenth aspect, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

According to the tenth aspect or the first possible implementation manner of the tenth aspect, in a second possible implementation manner, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

According to an eleventh aspect, an embodiment of the present invention provides user equipment, including a transmitter, configured to send instruction information for activating measurement in an inter-frequency compressed mode to a radio network controller, where the instruction information for activating measurement in an inter-frequency compressed mode is used to instruct the radio network controller to activate a configuration of an inter-frequency compressed mode of a base station; and a processor, configured to perform measurement on an inter-frequency neighboring cell in a manner of measurement in an inter-frequency compressed mode; and configured to report an inter-frequency measurement result to the radio network controller.

In a first possible implementation manner of the eleventh aspect, the processor is further configured to: when it is determined that signal quality of an intra-frequency cell meets standard information of a signal measurement report of the intra-frequency cell, determine that the user equipment is in proximity to the inter-frequency neighboring cell; or configured to: when it is determined that signal quality of the inter-frequency neighboring cell at a current position of the user equipment falls within a preset range, determine that the user equipment is in proximity to the inter-frequency neighboring cell; or configured to: when it is determined that a distance between a current position of the user equipment and a neighboring base station falls within a preset range, determine that the user equipment is in proximity to the inter-frequency neighboring cell.

According to the eleventh aspect or the first possible implementation manner of the eleventh aspect, in a second possible implementation manner, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

According to the eleventh aspect or any one of the first to the second possible implementation manners of the eleventh aspect, in a third possible implementation manner, the user equipment further includes: a receiver, configured to receive configuration information that is of the inter-frequency compressed mode and sent by the radio network controller.

According to the eleventh aspect or any one of the first to the third possible implementation manners of the eleventh aspect, in a fourth possible implementation manner, the receiver is further configured to receive a response message that is from the radio network controller and with respect to the instruction information for activating measurement in an inter-frequency compressed mode.

According to a twelfth aspect, an embodiment of the present invention provides a radio network controller, including a receiver, configured to receive instruction information that is sent by user equipment and for activating measurement in an inter-frequency compressed mode, where the instruction information for activating measurement in an inter-frequency compressed mode is used to instruct the radio network controller to activate a configuration of an inter-frequency compressed mode of a base station; and a processor, configured to activate the configuration of the compressed mode according to the instruction information for activating measurement in an inter-frequency compressed mode; where the receiver is further configured to receive an inter-frequency measurement result of measurement performed on an inter-frequency neighboring cell by the user equipment in a manner of measurement in an inter-frequency compressed mode.

In a first possible implementation manner of the twelfth aspect, the radio network controller further includes: a transmitter, configured to send configuration information of the inter-frequency compressed mode to the user equipment.

According to the twelfth aspect or the first possible implementation manner of the twelfth aspect, in a second possible implementation manner, the transmitter is further configured to send the user equipment a response message with respect to the instruction information for activating measurement in an inter-frequency compressed mode.

According to the twelfth aspect or any one of the first to the second possible implementation manners of the twelfth aspect, in a third possible implementation manner, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

In the inter-frequency neighboring cell proximity detection method, inter-frequency neighboring cell measurement method, radio network controller, and user equipment according to the embodiments of the present invention, a radio network controller sends proximity detection information of an inter-frequency neighboring cell to user equipment, where the proximity detection information of the inter-frequency neighboring cell is used to indicate standard information of a signal measurement report of an intra-frequency cell; the user equipment may perform measurement on a signal of an intra-frequency cell of a current serving cell according to the proximity detection information of the inter-frequency neighboring cell, compare a measurement result with the proximity detection information of the inter-frequency neighboring cell, and when the information is met, report to the radio network controller that the user equipment is in proximity to the inter-frequency neighboring cell, so that the user equipment may determine that the user equipment is in proximity to the inter-frequency neighboring cell with no need to enable an inter-frequency compressed mode to measure an inter-frequency cell, thereby reducing power consumption of the user equipment and improving data transmission performance of the user equipment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
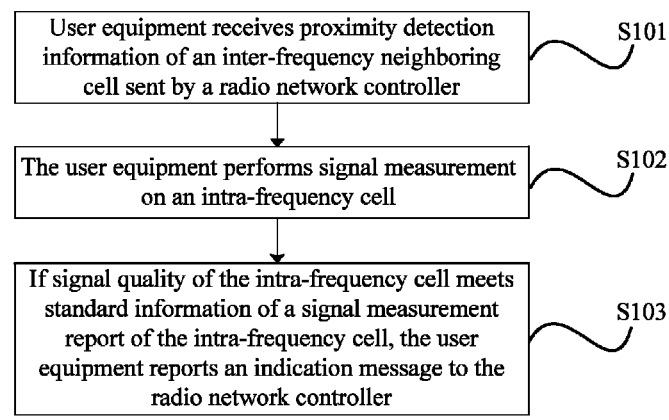
FIG. 1 is a flowchart of a method for detecting proximity of an inter-frequency neighboring cell according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Methods in the embodiments described in this specification are applicable to an inter-frequency heterogeneous network, where the inter-frequency heterogeneous network may include various communications systems, for example, current 2G and 3G communications systems and next-generation communications systems, for example, a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, and other such communications systems.

User equipment in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

A radio network controller in this application may specifically include a base station (for example, an access point), and may refer to a device in communication with a wireless terminal by using one or more sectors at an air interface in an access network. The base station may be configured to perform mutual conversion between received over-the-air frames and IP packets and serve as a router between the wireless terminal and a rest portion of the access network, where the rest portion of the access network may include an Internet Protocol (IP) network. The base station may further coordinate attribute management of the air interface. For example, the base station may be a base transceiver station (BTS) in GSM or CDMA, or may be a NodeB in WCDMA, or may be an evolved NodeB in LTE, which is not limited in this application.

FIG. 1 is a flowchart of a method for detecting proximity of an inter-frequency neighboring cell according to Embodiment 1 of the present invention. The method provided in this embodiment mainly involves an inter-frequency scenario of a heterogeneous network. The heterogeneous network is a network made up of cells of different sizes and different types. The cells of the heterogeneous network may include cells in various forms, such as a macro cell (Macro cell), a micro cell (Micro Cell), a pico cell (Pico Cell), a femto cell (Femto Cell), and a remote radio head (RRH). In a scenario of this embodiment of the present invention, a few inter-frequency micro-type cells may be deployed in a macro cell. As shown in FIG. 1, the method in this embodiment may include the following steps.

S101: User equipment receives proximity detection information of an inter-frequency neighboring cell sent by a radio network controller.

In this specification, the proximity means signal quality of an inter-frequency neighboring cell at a position at which the user equipment is located falls within a preset range, or a distance between a position at which the user equipment is located and a position of an inter-frequency neighboring base station falls within a preset range, or signal quality of an intra-frequency neighboring cell at a position at which the user equipment is located falls within a preset range.

When the user equipment is located in a cell, the radio network controller may determine proximity detection information of an inter-frequency neighboring cell of a current serving cell of the user equipment, and then send the proximity detection information of the inter-frequency neighboring cell to the user equipment. Specifically, the proximity detection information of the inter-frequency neighboring cell is used to indicate standard information of a signal measurement report of an intra-frequency cell.

Specifically, the foregoing intra-frequency cell may include the current serving cell of the user equipment, and may further include another intra-frequency cell of the current serving cell of the user equipment. The proximity detection information of the inter-frequency neighboring cell may include a threshold or threshold range information of signal quality, signal strength, path loss, or the like of the intra-frequency cell, or may include a threshold, a threshold range, or the like of a difference between measurement results of any two cells. Further, the proximity detection information of the inter-frequency neighboring cell may further include information, such as a scrambling code or a cell identity, about the proximate inter-frequency neighboring cell when the signal quality of the intra-frequency cell meets the foregoing threshold, and may further include duration for which the foregoing threshold is met.

In addition, before receiving the proximity detection information of the inter-frequency neighboring cell sent by the radio network controller, the user equipment may report a capability of supporting proximity detection of an inter-frequency neighboring cell by the user equipment, so that the radio network controller determines whether the UE supports the capability, and further delivers a foregoing proximity detection instruction to only UEs that support the capability.

S102: The user equipment performs signal measurement on an intra-frequency cell.

Specifically, after receiving the proximity detection information of the inter-frequency neighboring cell sent by the radio network controller, the user equipment performs measurement on a signal of the intra-frequency cell according to the standard information that is of the signal measurement report of the intra-frequency cell and indicated by the information. It may be understood that, if the intra-frequency cell includes only the current serving cell of the user equipment, the user equipment may perform measurement on a signal of the current serving cell; if the intra-frequency cell further includes another intra-frequency cell of the current serving cell, the user equipment may further perform measurement on a signal of the another intra-frequency cell of the current serving cell, in addition to performing measurement on the signal of the current serving cell.

S103: If signal quality of the intra-frequency cell meets standard information of a signal measurement report of the intra-frequency cell, the user equipment reports an indication message to the radio network controller.

Specifically, after performing signal measurement on the intra-frequency cell, the user equipment compares a measurement result with the standard information that is of the signal measurement report of the intra-frequency cell and indicated by the received proximity detection information of the inter-frequency neighboring cell, to determine whether the standard information of the signal measurement report of the intra-frequency cell is met. When the signal quality of the intra-frequency cell meets the standard information of the signal measurement report of the intra-frequency cell, the user equipment reports the indication message to the radio network controller, where the indication message may be used to indicate that the user equipment is in proximity to an inter-frequency cell of the current serving cell, that is, the user equipment is in proximity to the inter-frequency neighboring cell. A measurement report indication message may include at least one piece of the following information: a measurement result and information, such as a scrambling code or a cell identity, about the proximate inter-frequency neighboring cell when the user equipment is in proximity to the inter-frequency neighboring cell and the signal quality of the intra-frequency cell meets the standard information of the signal measurement report of the intra-frequency cell.

It may be understood that, if the intra-frequency cell includes only the current serving cell of the user equipment, the user equipment may report the indication message to the radio network controller when signal quality of the current serving cell meets the standard information of the signal measurement report of the intra-frequency cell; if the foregoing intra-frequency cell further includes another intra-frequency cell of the current serving cell, the user equipment may report the indication message to the radio network controller when both the signal quality of the current serving cell and a signal quality of the another intra-frequency cell of the current serving cell meet the standard information of the signal measurement report of the intra-frequency cell.

In the method for detecting proximity of an inter-frequency neighboring cell according to this embodiment, a radio network controller sends proximity detection information of an inter-frequency neighboring cell to user equipment, where the proximity detection information of the inter-frequency neighboring cell is used to indicate standard information of a signal measurement report of an intra-frequency cell; the user equipment may perform measurement on a signal of an intra-frequency cell of a current serving cell according to the proximity detection information of the inter-frequency neighboring cell, compare a measurement result with the proximity detection information of the inter-frequency neighboring cell, and when the information is met, report to the radio network controller that the user equipment is in proximity to the inter-frequency neighboring cell, so that the user equipment may determine that the user equipment is in proximity to the inter-frequency neighboring cell with no need to enable an inter-frequency compressed mode to measure an inter-frequency cell, thereby reducing power consumption of the user equipment and improving data transmission performance of the user equipment.

Figure 2:
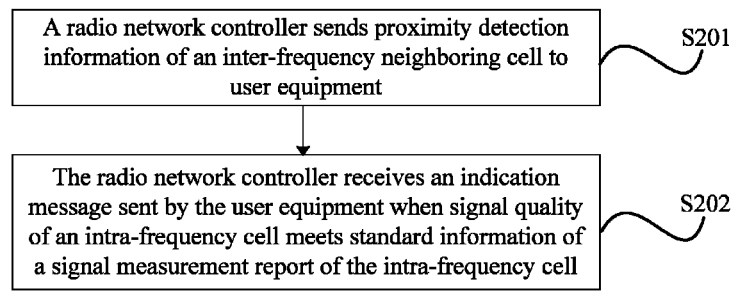
FIG. 2 is a flowchart of a method for detecting proximity of an inter-frequency neighboring cell according to Embodiment 2 of the present invention.

FIG. 2 is a flowchart of a method for detecting proximity of an inter-frequency neighboring cell according to Embodiment 2 of the present invention. The method provided in this embodiment mainly involves an inter-frequency scenario of a heterogeneous network. The heterogeneous network is a network made up of cells of different sizes and different types. The cells of the heterogeneous network may include cells in various forms, such as a macro cell, a micro cell, a pico cell, a femto cell, and a remote radio head (RRH). As shown in FIG. 2, the method in this embodiment may include the following steps.

S201: A radio network controller sends proximity detection information of an inter-frequency neighboring cell to user equipment.

The proximity detection information of the inter-frequency neighboring cell is used to indicate standard information of a signal measurement report of an intra-frequency cell, so that the user equipment performs signal measurement on the foregoing intra-frequency cell.

Specifically, when the user equipment is located in a cell, the radio network controller may determine proximity detection information of an inter-frequency neighboring cell of a current serving cell of the user equipment, and then send the proximity detection information of the inter-frequency neighboring cell to the user equipment. The proximity detection information of the inter-frequency neighboring cell is used to indicate the standard information of the signal measurement report of the intra-frequency cell, so that the user equipment performs signal measurement on the foregoing intra-frequency cell.

Specifically, the foregoing intra-frequency cell may include the current serving cell of the user equipment, and may further include another intra-frequency cell of the current serving cell of the user equipment. The proximity detection information of the inter-frequency neighboring cell may include a threshold or threshold range information of signal quality, signal strength, path loss, or the like of the intra-frequency cell, or may include a threshold, a threshold range, or the like of a difference between measurement results of any two intra-frequency cells. Further, the proximity detection information of the inter-frequency neighboring cell may further include information, such as a scrambling code or a cell identity, about the proximate inter-frequency neighboring cell when the signal measurement of the intra-frequency cell meets the foregoing threshold, and may further include duration for which the foregoing threshold is met.

In addition, before sending the proximity detection information of the inter-frequency neighboring cell to the user equipment, the radio network controller may receive a capability, sent by the user equipment, of supporting proximity detection of an inter-frequency neighboring cell, so that the radio network controller determines whether the UE supports the capability, and further delivers the foregoing proximity detection instruction to only UEs that support the capability.

S202: The radio network controller receives an indication message sent by the user equipment when signal quality of an intra-frequency cell meets standard information of a signal measurement report of the intra-frequency cell.

Specifically, after receiving the proximity detection information of the inter-frequency neighboring cell sent by the radio network controller, the user equipment performs measurement on a signal of an intra-frequency cell of a cell in which the user equipment is located. It may be understood that, if the intra-frequency cell includes only the current serving cell of the user equipment, the user equipment may perform measurement on a signal of the current serving cell; if the intra-frequency cell further includes another intra-frequency cell of the current serving cell, the user equipment may further perform measurement on a signal of the another intra-frequency cell of the current serving cell, besides performing measurement the signal of the current serving cell.

After performing signal measurement on the intra-frequency cell, the user equipment compares a measurement result with the standard information that is of the signal measurement report of the intra-frequency cell and indicated by the received proximity detection information of the inter-frequency neighboring cell, to determine whether the standard information of the signal measurement report of the intra-frequency cell is met. When the signal quality of the intra-frequency cell meets the standard information of the signal measurement report of the intra-frequency cell, the user equipment reports the indication message to the radio network controller, and the radio network controller receives the indication message. The indication message may be used to indicate that the user equipment is in proximity to an inter-frequency cell of the current serving cell, that is, the user equipment is in proximity to the inter-frequency neighboring cell. It may be understood that, if the intra-frequency cell includes only the current serving cell of the user equipment, the user equipment may report the indication message to the radio network controller when signal quality of the current serving cell meets the standard information of the signal measurement report of the intra-frequency cell; if the intra-frequency cell further includes another intra-frequency cell of the current serving cell, the user equipment may report the indication message to the radio network controller when both the signal quality of the current serving cell and a signal quality of the another intra-frequency cell of the current serving cell meet the standard information of the signal measurement report of the intra-frequency cell. A measurement report indication message may include at least one piece of the following information: a measurement result and information, such as a scrambling code or a cell identity, about the proximate inter-frequency neighboring cell when the user equipment is in proximity to the inter-frequency neighboring cell and the signal measurement of the intra-frequency cell meets the standard information of the signal measurement report of the intra-frequency cell.

In the method for detecting proximity of an inter-frequency neighboring cell according to this embodiment, a radio network controller sends proximity detection information of an inter-frequency neighboring cell to user equipment, where the proximity detection information of the inter-frequency neighboring cell is used to indicate standard information of a signal measurement report of an intra-frequency cell; the user equipment may perform measurement on a signal of an intra-frequency cell of a current serving cell according to the proximity detection information of the inter-frequency neighboring cell, compare a measurement result with the proximity detection information of the inter-frequency neighboring cell, and when the information is met, report to the radio network controller that the user equipment is in proximity to the inter-frequency neighboring cell, so that the user equipment may determine that the user equipment is in proximity to the inter-frequency neighboring cell with no need to enable an inter-frequency compressed mode to measure an inter-frequency cell, thereby reducing power consumption of the user equipment and improving data transmission performance of the user equipment.

The foregoing method for detecting proximity of an inter-frequency neighboring cell may also be applied to proximity detection of an intra-frequency micro neighboring cell. A difference between the detection and the foregoing method lies in that: the indication message is a detection message of the intra-frequency micro neighboring cell, what is delivered in the indication message is cell information of the proximate intra-frequency micro neighboring cell, and reporting the indication message is indicating proximity of the intra-frequency micro neighboring cell.

Figure 3:
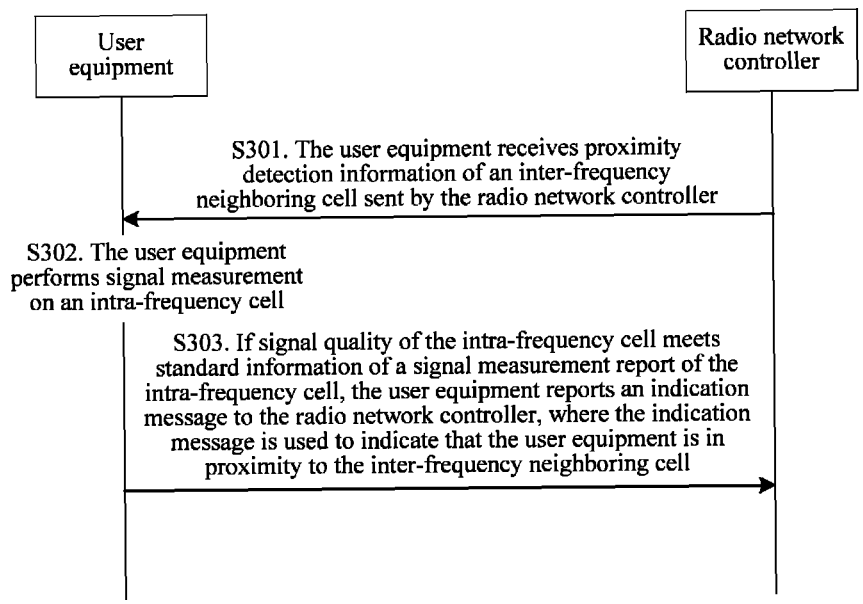
FIG. 3 is a flowchart of a method for detecting proximity of an inter-frequency neighboring cell according to Embodiment 3 of the present invention.
Figure 4:
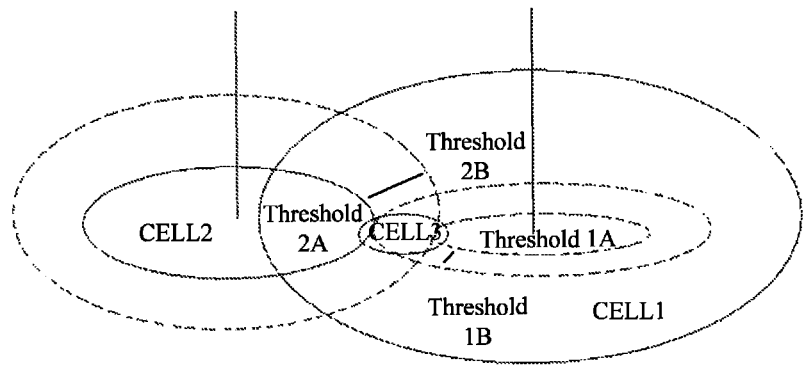
FIG. 4 is a schematic diagram of coverage of cells of an inter-frequency heterogeneous network according to an embodiment of the present invention.

FIG. 3 is a flowchart of a method for detecting proximity of an inter-frequency neighboring cell according to Embodiment 3 of the present invention, and FIG. 4 is a schematic diagram of coverage of cells of an inter-frequency heterogeneous network according to this embodiment of the present invention. As shown in FIG. 3, this embodiment provides a scenario in which user equipment performs intra-frequency measurement, and discovers an inter-frequency neighboring cell according to proximity detection information of the inter-frequency neighboring cell sent by a radio network controller.

This embodiment provides a specific implementation scenario in which the user equipment is located within coverage of at least one macro cell. As shown in FIG. 4, the macro cell may include only CELL1, or may include CELL1 and CELL2, where CELL1 and CELL2 are intra-frequency cells; at least one inter-frequency neighboring cell CELL3 is included within the coverage of the at least one macro cell. The following only describes a case in which the two intra-frequency macro cells CELL1 and CELL2 and one inter-frequency cell CELL3 are included. Other cases are similar. Coverage of CELL3 is less than coverage of CELL1. A communication process between the user equipment and the radio network controller may be specifically as follows:

S301: User equipment receives proximity detection information of an inter-frequency neighboring cell sent by a radio network controller.

When the user equipment is located in a cell, the radio network controller may determine proximity detection information of an inter-frequency neighboring cell of the cell in which the user equipment is located, and then send the proximity detection information of the inter-frequency neighboring cell to the user equipment, and the user equipment receives the proximity detection information.

Specifically, it is assumed that the user equipment is currently located in the macro cell CELL1, and when the user equipment is in a connected state, the user equipment may receive the proximity detection information of the inter-frequency neighboring cell sent by the radio network controller. The foregoing connected state may be a state in which the user equipment is communicating with the radio network controller, such as a state of being on a call or surfing the Internet.

Specifically, the proximity detection information of the inter-frequency neighboring cell is used to indicate standard information of a signal measurement report of an intra-frequency cell, and the standard information of the signal measurement report of the intra-frequency cell may include at least one piece of the following information: threshold information that needs to be met by signal quality of the intra-frequency cell, hysteresis information that needs to be met by the signal quality of the intra-frequency cell, and duration information that is of a measurement report standard and needs to be met by the signal quality of the intra-frequency cell. That is, threshold information, hysteresis information, and duration information of a measurement report standard that needs to be met by signal quality of CELL1 and/or CELL2 may be included. As shown in FIG. 4, threshold (Threshold) information such as Threshold1A, Threshold1B, Threshold2A and Threshold2B may be included; or information about the proximate inter-frequency neighboring cell when the signal measurement of the intra-frequency cell meets the foregoing threshold, such as a scrambling code of CELL3 or a cell identity of CELL3, may further be included. In addition, measurement threshold of the intra-frequency cell may be set to be relatively low, for example, the threshold is lower than a signal quality threshold of a cell that can provide normal user access.

S302: The user equipment performs signal measurement on an intra-frequency cell.

Specifically, after receiving proximity detection information of an inter-frequency neighboring cell of CELL1 and/or CELL2 sent by the radio network controller, the user equipment performs measurement on signals/a signal of the intra-frequency cells/cell CELL1 and/or CELL2 according to the standard information that is of the signal measurement report of the intra-frequency cell and indicated by the information.

S303: If signal quality of the intra-frequency cell meets standard information of a signal measurement report of the intra-frequency cell, the user equipment reports an indication message to the radio network controller, where the indication message is used to indicate that the user equipment is in proximity to the inter-frequency neighboring cell.

Specifically, after performing signal measurement on the intra-frequency cells/cell CELL1 and/or CELL2, the user equipment compares a measurement result with the standard information that is of the signal measurement report of the intra-frequency cell and indicated by the received proximity detection information of the inter-frequency neighboring cell, to determine whether the standard information of the signal measurement report of the intra-frequency cell is met.

Specifically, it is determined whether signals/a signal quality of the intra-frequency cells/cell CELL1 and/or CELL2 meets the standard information of the signal measurement report of the intra-frequency cell, which may be expressed by using at least one of signal quality signal-to-noise ratio information, signal strength information, and path loss information that are of the intra-frequency cell, or may be expressed by using at least one of signal quality signal-to-noise ratio difference information, signal strength difference information, and path loss difference information that are of any two intra-frequency cells. For example, the signal quality may be expressed by using at least one of signal quality signal-to-noise ratio difference information, signal strength difference information, and path loss difference information that are of the intra-frequency cells CELL1 and CELL2.

When the signal quality of the intra-frequency cells/cell CELL1 and/or CELL2 meets the standard information of the signal measurement report of the intra-frequency cell, the user equipment reports the indication message to the radio network controller, where the indication message may be specifically used to indicate that the user equipment is in proximity to an inter-frequency cell of a current serving cell, that is, the user equipment is in proximity to the inter-frequency neighboring cell. Further, the indication message may include measurement results/a measurement result of CELL1 and/or CELL2, and information about the proximate inter-frequency neighboring cell CELL3, such as a scrambling code or a cell identity. In addition, the radio network controller sets duration for which a threshold is met, and when the foregoing intra-frequency cell meets the standard information of the signal measurement report, the user equipment reports the indication message to a network only after the duration, for which the threshold is met, set by the radio network controller expires.

In the method for detecting proximity of an inter-frequency neighboring cell according to this embodiment, a radio network controller sends proximity detection information of an inter-frequency neighboring cell to user equipment, where the proximity detection information of the inter-frequency neighboring cell is used to indicate standard information of a signal measurement report of an intra-frequency cell; the user equipment may perform measurement on a signal of an intra-frequency cell of a current serving cell according to the proximity detection information of the inter-frequency neighboring cell, compare a measurement result with the proximity detection information of the inter-frequency neighboring cell, and when the information is met, report to the radio network controller that the user equipment is in proximity to the inter-frequency neighboring cell, so that the user equipment may determine that the user equipment is in proximity to the inter-frequency neighboring cell with no need to enable an inter-frequency compressed mode to measure an inter-frequency cell, thereby reducing power consumption of the user equipment and improving data transmission performance of the user equipment.

Figure 5:
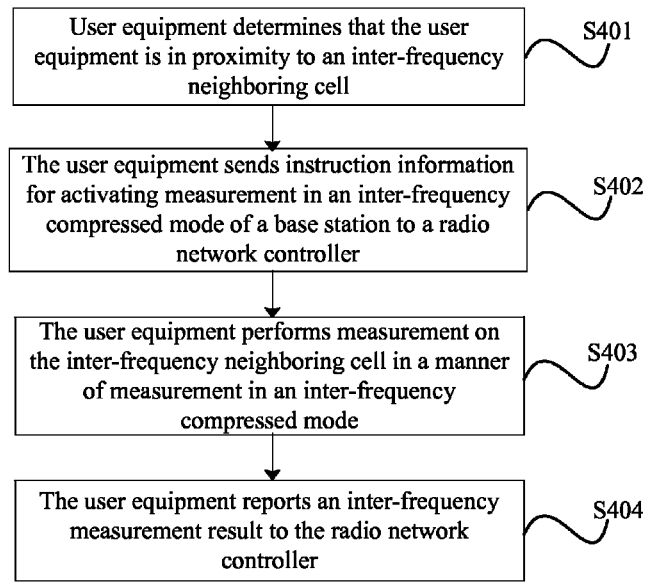
FIG. 5 is a flowchart of a method for measuring an inter-frequency neighboring cell according to Embodiment 4 of the present invention.

FIG. 5 is a flowchart of a method for measuring an inter-frequency neighboring cell according to Embodiment 4 of the present invention. The method provided in this embodiment mainly involves an inter-frequency scenario of a heterogeneous network. The heterogeneous network is a network made up of cells of different sizes and different types. The cells of the heterogeneous network may include cells in various forms, such as a macro cell, a micro cell, a pico cell, a femto cell, and a remote radio head (RRH). In a scenario of this embodiment of the present invention, a small quantity of inter-frequency micro-type cells may be deployed in a macro cell. As shown in FIG. 5, the method in this embodiment may include the following steps.

S401: User equipment determines that the user equipment is in proximity to an inter-frequency neighboring cell.

For example, when determining that signal quality of an intra-frequency cell meets standard information of a signal measurement report of the intra-frequency cell, the user equipment determines that the user equipment is in proximity to the inter-frequency neighboring cell; or when determining that signal quality of the inter-frequency neighboring cell at a current position of the user equipment falls within a preset range, the user equipment determines that the user equipment is in proximity to the inter-frequency neighboring cell; or when determining that a distance between a current position of the user equipment and a neighboring base station falls within a preset range, the user equipment determines that the user equipment is in proximity to the inter-frequency neighboring cell.

The user equipment first determines that the user equipment is in proximity to the inter-frequency neighboring cell. In a feasible implementation manner, the user equipment may use the methods for detecting proximity of an inter-frequency neighboring cell that are shown in FIG. 1 to FIG. 4 to determine that the user equipment is in proximity to the inter-frequency neighboring cell; that is, the user equipment first receives proximity detection information of the inter-frequency neighboring cell sent by a radio network controller, then performs signal measurement on the intra-frequency cell, and if the signal quality of the intra-frequency cell meets the standard information of the signal measurement report of the intra-frequency cell, reports an indication message to the radio network controller, to indicate that the user equipment is in proximity to the inter-frequency neighboring cell. For specific processes of the methods, reference may be made to related descriptions of the embodiments shown in FIG. 1 to FIG. 4. In another feasible implementation manner, the user equipment may determine, according to internal fingerprint information, whether a condition for proximity to a micro cell is met, where the fingerprint information may be information such as position information, signal quality information, network code, or a quality threshold range that is of a current intra-frequency cell and previously stored in the user equipment.

S401 is optional, and in another embodiment of the present invention, when the user equipment is not in proximity to the inter-frequency neighboring cell, S402 and subsequent steps may also be performed.

S402: The user equipment sends instruction information for activating measurement in an inter-frequency compressed mode of a base station to a radio network controller.

Specifically, because generally only one transceiver is designed in the user equipment, measurement can be performed on only one carrier at one time, and therefore, after the user equipment determines that the user equipment is already in proximity to the inter-frequency neighboring cell, the user equipment may enable an inter-frequency compressed mode to perform measurement on the inter-frequency neighboring cell.

Specifically, the user equipment may send the instruction information for activating measurement in the inter-frequency compressed mode of the base station to the radio network controller, where the instruction information for activating measurement in the inter-frequency compressed mode is used to instruct the radio network controller to activate a configuration of the inter-frequency compressed mode of the base station. The instruction information for activating measurement in an inter-frequency compressed mode may include a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter. Another activation manner is immediate activation; in this case, the instruction information for activating measurement in an inter-frequency compressed mode may not include the number of the frame in which measurement in the compressed mode is activated, and the radio network controller activates the configuration of the compressed mode of the base station in a next frame after a radio frame in which the instruction information is received.

Alternatively, another specific implementation manner is that: the user equipment sends the instruction information for activating measurement in an inter-frequency compressed mode to the base station; after receiving the instruction information, the base station enables the configuration of the inter-frequency compressed mode at an activation time; the base station notifies the radio network controller of the sent instruction information for activating measurement in an inter-frequency compressed mode. Similarly, if the number of the frame in which measurement in the compressed mode is activated is not included, the inter-frequency compressed mode is activated in a frame next to a radio frame in which the instruction information is received.

S403: The user equipment performs measurement on the inter-frequency neighboring cell in a manner of measurement in an inter-frequency compressed mode.

Specifically, after the user equipment sends the instruction information for activating measurement in an inter-frequency compressed mode to the radio network controller, the user equipment may perform measurement the inter-frequency neighboring cell in the manner of measurement in an inter-frequency compressed mode at an activation time set in the instruction information for activating measurement in an inter-frequency compressed mode or in a frame next to a radio frame in which the radio network controller receives the instruction information.

S404: The user equipment reports an inter-frequency measurement result to the radio network controller.

Specifically, the user equipment performs measurement in an inter-frequency compressed mode on the inter-frequency neighboring cell, and then reports a result of the measurement in an inter-frequency compressed mode to the radio network controller.

In addition, when determining that the user equipment has left the inter-frequency neighboring cell, the user equipment may send an instruction information to the radio network controller, to instruct the radio network controller to deactivate the configuration of the inter-frequency compressed mode of the base station. The instruction information includes at least a deactivation time, and the user equipment disables the inter-frequency compressed mode at the deactivation time.

In the method for measuring an inter-frequency neighboring cell according to the foregoing embodiment, a radio network controller sends proximity detection information of an inter-frequency neighboring cell to user equipment; the user equipment may perform measurement on a signal of an intra-frequency cell of a current serving cell according to the proximity detection information of the inter-frequency neighboring cell, compare a measurement result with the proximity detection information of the inter-frequency neighboring cell, and when the information is met, report to the radio network controller that the user equipment is in proximity to the inter-frequency neighboring cell; the user equipment instructs the radio network controller to activate a configuration of an inter-frequency compressed mode of a base station, performs measurement on an inter-frequency cell in a manner of measurement in an inter-frequency compressed mode, and reports an inter-frequency measurement result to the radio network controller, so that the user equipment does not need to always enable the inter-frequency compressed mode to measure the inter-frequency neighboring cell, thereby reducing power consumption of the user equipment and improving data transmission performance of the user equipment.

Figure 6:
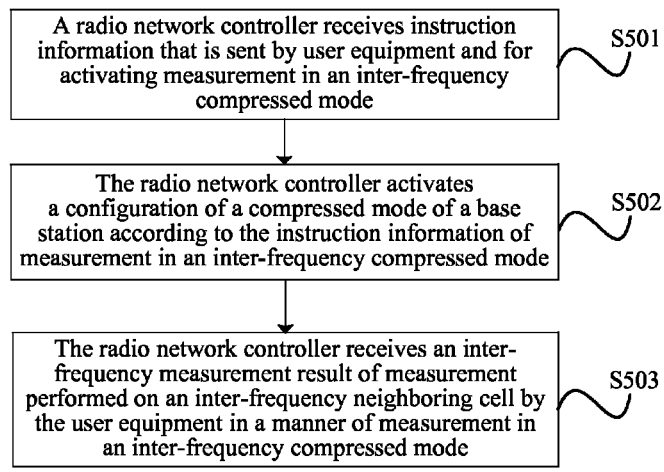
FIG. 6 is a flowchart of a method for measuring an inter-frequency neighboring cell according to Embodiment 5 of the present invention.

FIG. 6 is a flowchart of a method for measuring an inter-frequency neighboring cell according to Embodiment 5 of the present invention. The method provided in this embodiment mainly involves an inter-frequency scenario of a heterogeneous network. The heterogeneous network is a network made up of cells of different sizes and different types. The cells of the heterogeneous network may include cells in various forms, such as a macro cell, a micro cell, a pico cell, a femto cell, and an RRH. In a scenario of this embodiment of the present invention, a small quantity of inter-frequency micro-type cells may be deployed in a macro cell. As shown in FIG. 6, the method in this embodiment may include the following steps:

S501: A radio network controller receives instruction information that is sent by user equipment and for activating measurement in an inter-frequency compressed mode.

Specifically, because generally only one transceiver is designed in the user equipment, measurement can be performed on only one carrier at one time, and therefore, when the user equipment determines that the user equipment is in proximity to an inter-frequency neighboring cell, the user equipment may enable an inter-frequency compressed mode to perform measurement on the inter-frequency neighboring cell.

Specifically, the user equipment may send the instruction information for activating measurement in an inter-frequency compressed mode to the radio network controller, and the radio network controller receives the instruction information for activating measurement in an inter-frequency compressed mode. The instruction information for activating measurement in an inter-frequency compressed mode is used to instruct the radio network controller to activate a configuration of an inter-frequency compressed mode of a base station. The instruction information for activating measurement in an inter-frequency compressed mode may include a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

S502: The radio network controller activates a configuration of a compressed mode of a base station according to the instruction information for activating measurement in an inter-frequency compressed mode.

Specifically, after receiving the instruction information that is sent by the user equipment and for activating measurement in an inter-frequency compressed mode, the radio network controller may activate the configuration of the compressed mode of the base station according to the instruction information for activating measurement in an inter-frequency compressed mode, so as to cooperate with the user equipment in measurement in an inter-frequency compressed mode on the inter-frequency neighboring cell.

S503: The radio network controller receives an inter-frequency measurement result of measurement performed on an inter-frequency neighboring cell by the user equipment in a manner of measurement in an inter-frequency compressed mode.

Specifically, after the radio network controller activates the configuration of the compressed mode according to the instruction information for activating measurement in an inter-frequency compressed mode, the user equipment may directly perform measurement the inter-frequency neighboring cell in the manner of measurement in an inter-frequency compressed mode, and then report a result of the measurement in an inter-frequency compressed mode to the radio network controller, and the radio network controller receives the inter-frequency measurement result.

In the method for measuring an inter-frequency neighboring cell according to the foregoing embodiment, a radio network controller sends proximity detection information of an inter-frequency neighboring cell to user equipment; the user equipment may perform measurement on a signal of an intra-frequency cell of a current serving cell according to the proximity detection information of the inter-frequency neighboring cell, compare a measurement result with the proximity detection information of the inter-frequency neighboring cell, and when the information is met, report to the radio network controller that the user equipment is in proximity to the inter-frequency neighboring cell; the user equipment instructs the radio network controller to activate a configuration of an inter-frequency compressed mode of a base station, performs measurement on the inter-frequency neighboring cell in a manner of measurement in an inter-frequency compressed mode, and reports an inter-frequency measurement result to the radio network controller, so that the user equipment does not need to always enable the inter-frequency compressed mode to measure the inter-frequency neighboring cell, thereby reducing power consumption of the user equipment and improving data transmission performance of the user equipment.

Figure 7:
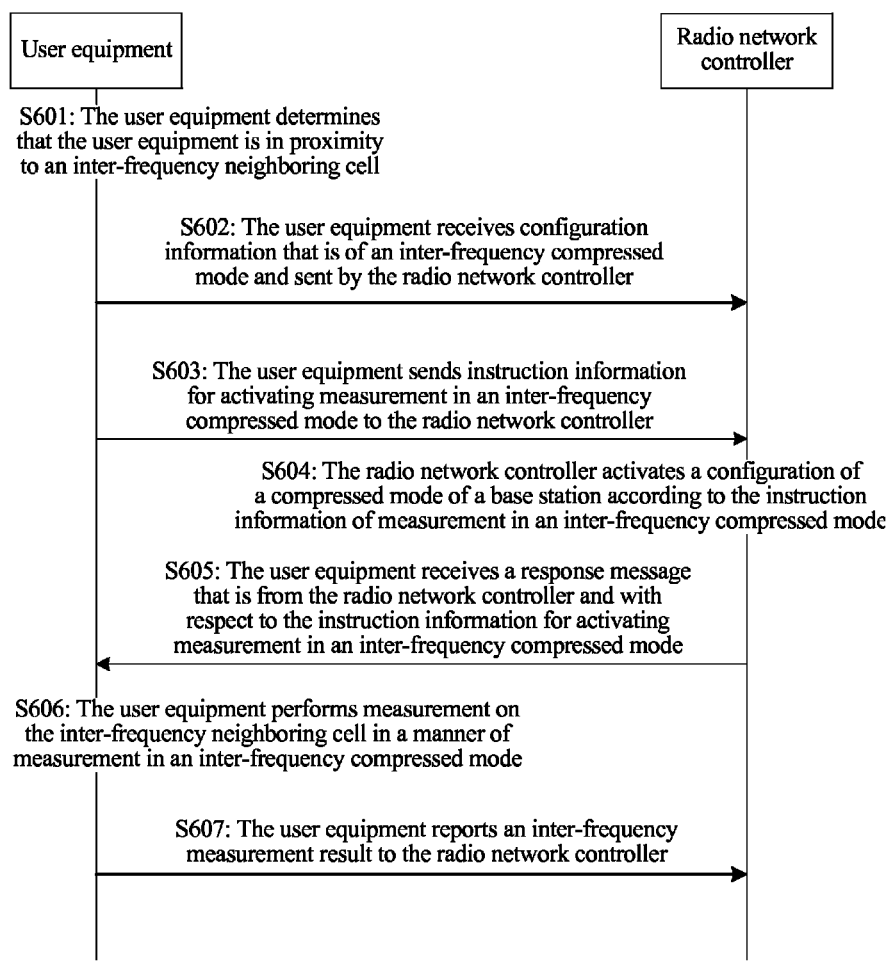
FIG. 7 is a flowchart of a method for measuring an inter-frequency neighboring cell according to Embodiment 6 of the present invention.

FIG. 7 is a flowchart of a method for measuring an inter-frequency neighboring cell according to Embodiment 6 of the present invention, and FIG. 4 is a schematic diagram of coverage of cells of an inter-frequency heterogeneous network according to this embodiment of the present invention. As shown in FIG. 7, this embodiment provides a scenario in which user equipment determines that the user equipment is in proximity to a micro cell, instructs a radio network controller to activate a configuration of an inter-frequency compressed mode of a base station, and performs inter-frequency measurement.

This embodiment provides a specific implementation scenario in which the user equipment is located within coverage of at least one macro cell. As shown in FIG. 4, the macro cell may include only CELL1, or may include CELL1 and CELL2, where CELL1 and CELL2 are intra-frequency cells; at least one inter-frequency neighboring cell CELL3 is included within the coverage of the at least one macro cell.

The following only describes a case in which the two intra-frequency macro cells CELL1 and CELL2 and one inter-frequency cell CELL3 are included. Other cases are similar. Coverage of CELL3 is less than coverage of CELL1. A communication process between the user equipment and the radio network controller may be specifically as follows:

S601: User equipment determines that the user equipment is in proximity to an inter-frequency neighboring cell.

For example, when determining that signal quality of an intra-frequency cell meets standard information of a signal measurement report of the intra-frequency cell, the user equipment determines that the user equipment is in proximity to the inter-frequency neighboring cell; or when determining that signal quality of the inter-frequency neighboring cell at a current position of the user equipment falls within a preset range, the user equipment determines that the user equipment is in proximity to the inter-frequency neighboring cell; or when determining that a distance between a current position of the user equipment and a neighboring base station falls within a preset range, the user equipment determines that the user equipment is in proximity to the inter-frequency neighboring cell.

The user equipment first determines that the user equipment is in proximity to the inter-frequency neighboring cell. In a feasible implementation manner, the user equipment first receives proximity detection information of the inter-frequency neighboring cell sent by a radio network controller, then performs signal measurement on the intra-frequency cell, and if the signal quality of the intra-frequency cell meets the standard information of the signal measurement report of the intra-frequency cell, reports an indication message to the radio network controller, to indicate that the user equipment is in proximity to the inter-frequency neighboring cell.

In another feasible implementation manner, the user equipment may also determine, according to internal fingerprint information, whether a condition for that the user equipment is in proximity to the micro cell is met, where the fingerprint information may be, for example, information such as position information, signal quality information, network code, or a quality threshold range that is of a current intra-frequency cell and previously stored in the user equipment.

Specifically, it is assumed that a current serving cell of the user equipment is the macro cell CELL1, and when the user equipment is in a connected state, the user equipment may receive proximity detection information of the inter-frequency neighboring cell CELL3 sent by the radio network controller, and the user equipment determines whether the user equipment is in proximity to the micro cell by using the proximity detection information. The foregoing connected state may be a state in which the user equipment is communicating with the radio network controller, such as a state of being on a call or surfing the Internet. Alternatively, the user equipment may determine, according to information such as position information, signal quality information, network code, or a quality threshold range that is of the current serving cell CELL1 and the intra-frequency CELL2 of CELL1 and previously stored in the user equipment, whether the condition for proximity to the micro cell is met.

This step S601 is optional, and in another embodiment of the present invention, S602 may be directly performed when the user equipment determines that the user equipment is not in proximity to the inter-frequency neighboring cell.

S602: The user equipment receives configuration information that is of an inter-frequency compressed mode and sent by the radio network controller.

Optionally, before the user equipment sends instruction information for activating measurement in an inter-frequency compressed mode to the radio network controller, the radio network controller may send the configuration information of the inter-frequency compressed mode to the user equipment, and the user equipment receives the configuration information of the inter-frequency compressed mode.

S603: The user equipment sends instruction information for activating measurement in an inter-frequency compressed mode to the radio network controller.

Specifically, because generally only one transceiver is designed in the user equipment, measurement can be performed on only one carrier at one time, that is, measurement can be performed on only the current serving cell CELL1 and the intra-frequency cell CELL2 of CELL1. Therefore, after the user equipment determines that the user equipment is already in proximity to the inter-frequency neighboring cell CELL3, the user equipment may enable the inter-frequency compressed mode to perform measurement on the inter-frequency neighboring cell, that is, the inter-frequency compressed mode is enabled to perform measurement on CELL3.

Specifically, the user equipment may send the instruction information for activating measurement in an inter-frequency compressed mode to the radio network controller. The instruction information for activating measurement in an inter-frequency compressed mode is used to instruct the radio network controller to activate the configuration of the inter-frequency compressed mode of the base station. The instruction information for activating measurement in an inter-frequency compressed mode may include a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

S604: The radio network controller activates the configuration of the compressed mode of the base station according to the instruction information for activating measurement in an inter-frequency compressed mode.

Specifically, after receiving the instruction information that is sent by the user equipment and for activating measurement in an inter-frequency compressed mode, the radio network controller may activate the configuration of the compressed mode of the base station according to the instruction information for activating measurement in an inter-frequency compressed mode, so as to cooperate with the user equipment in measurement in an inter-frequency compressed mode on the inter-frequency neighboring cell CELL3.

S605: The user equipment receives a response message that is from the radio network controller and with respect to the instruction information for activating measurement in an inter-frequency compressed mode.

Optionally, after the radio network controller activates the configuration of the compressed mode according to the instruction information for activating measurement in an inter-frequency compressed mode, and before the user equipment performs measurement the inter-frequency neighboring cell CELL3 in a manner of measurement in an inter-frequency compressed mode, the radio network controller may further send the user equipment a response message with respect to the instruction information for activating measurement in an inter-frequency compressed mode, and the user equipment receives the response message that is from the radio network controller and with respect to the instruction information for activating measurement in an inter-frequency compressed mode.

S606: The user equipment performs measurement on the inter-frequency neighboring cell in a manner of measurement in an inter-frequency compressed mode.

Specifically, after the user equipment sends the instruction information for activating measurement in an inter-frequency compressed mode to the radio network controller, the user equipment may directly perform measurement the inter-frequency neighboring cell CELL3 in the manner of measurement in an inter-frequency compressed mode.

S607: The user equipment reports an inter-frequency measurement result to the radio network controller.

Specifically, the user equipment performs measurement in an inter-frequency compressed mode on the inter-frequency neighboring cell CELL3, and then reports a result of the measurement in an inter-frequency compressed mode to the radio network controller.

In the method for measuring an inter-frequency neighboring cell according to the foregoing embodiment, a radio network controller sends proximity detection information of an inter-frequency neighboring cell to user equipment; the user equipment may perform measurement on a signal of an intra-frequency cell of a current serving cell according to the proximity detection information of the inter-frequency neighboring cell, compare a measurement result with the proximity detection information of the inter-frequency neighboring cell, and when the information is met, report to the radio network controller that the user equipment is in proximity to the inter-frequency neighboring cell; the user equipment instructs the radio network controller to activate a configuration of an inter-frequency compressed mode of a base station, performs measurement on the inter-frequency neighboring cell in a manner of measurement in an inter-frequency compressed mode, and reports an inter-frequency measurement result to the radio network controller, so that the user equipment does not need to always enable the inter-frequency compressed mode to measure the inter-frequency neighboring cell, thereby reducing power consumption of the user equipment and improving data transmission performance of the user equipment.

Figure 8:
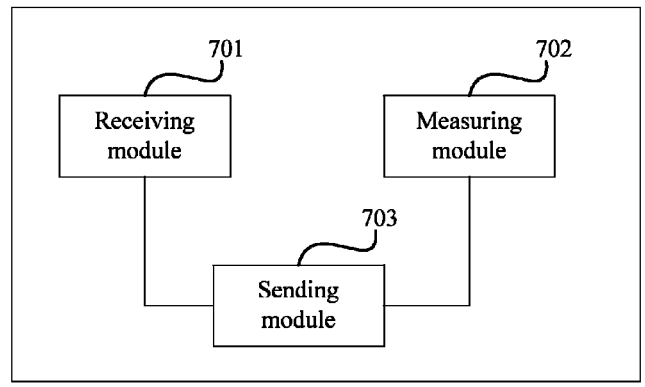
FIG. 8 is a schematic structural diagram of user equipment according to Embodiment 7 of the present invention.

FIG. 8 is a schematic structural diagram of user equipment according to Embodiment 7 of the present invention. As shown in FIG. 8, the user equipment may include a receiving module 701, a measuring module 702, and a sending module 703.

Specifically, the receiving module 701 may be configured to receive proximity detection information of an inter-frequency neighboring cell sent by a radio network controller, where the proximity detection information of the inter-frequency neighboring cell is used to indicate standard information of a signal measurement report of an intra-frequency cell.

The measuring module 702 may be configured to perform signal measurement on the intra-frequency cell.

The sending module 703 may be configured to: when signal quality of the intra-frequency cell meets the standard information of the signal measurement report of the intra-frequency cell, report an indication message to the radio network controller, where the indication message is used to indicate that the user equipment is in proximity to the inter-frequency neighboring cell.

The user equipment in this embodiment may be configured to execute the technical solution of the method embodiment shown in FIG. 1, and the implementation principles and technical effects of the user equipment are similar and are not described herein again.

On the basis of the foregoing embodiment, optionally, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

Further, on the basis of the foregoing embodiment, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

The user equipment in this embodiment may be configured to execute the technical solution of the method embodiment shown in FIG. 3 and FIG. 4, and the implementation principles and technical effects of the user equipment are similar and are not described herein again.

Figure 9:
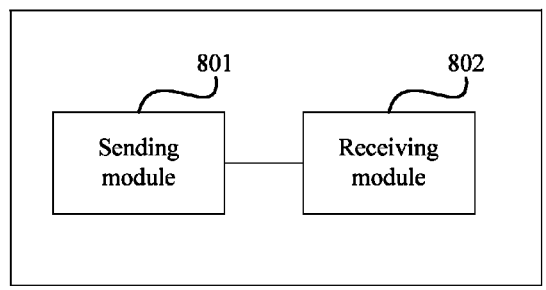
FIG. 9 is a schematic structural diagram of a radio network controller according to Embodiment 8 of the present invention.

FIG. 9 is a schematic structural diagram of a radio network controller according to Embodiment 8 of the present invention. As shown in FIG. 9, the radio network controller may include a sending module 801 and a receiving module 802.

Specifically, the sending module 801 may be configured to send proximity detection information of an inter-frequency neighboring cell to user equipment, where the proximity detection information of the inter-frequency neighboring cell is used to indicate standard information of a signal measurement report of an intra-frequency cell, so that the user equipment performs signal measurement on the intra-frequency cell.

The receiving module 802 may be configured to receive an indication message sent by the user equipment when signal quality of the intra-frequency cell meets the standard information of the signal measurement report of the intra-frequency cell, where the indication message is used to indicate that the user equipment is in proximity to the inter-frequency neighboring cell.

The radio network controller in this embodiment may be configured to execute the technical solution of the method embodiment shown in FIG. 2, and the implementation principles and technical effects of the radio network controller are similar and are not described herein again.

On the basis of the foregoing embodiment, optionally, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

Further, on the basis of the foregoing embodiment, optionally, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

The radio network controller in this embodiment may be configured to execute the technical solution of the method embodiment shown in FIG. 3 and FIG. 4, and the implementation principles and technical effects of the radio network controller are similar and are not described herein again.

Figure 10:
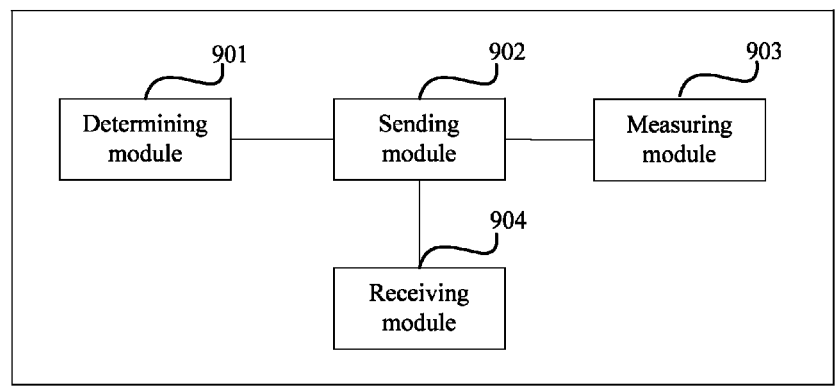
FIG. 10 is a schematic structural diagram of user equipment according to Embodiment 9 of the present invention.

FIG. 10 is a schematic structural diagram of user equipment according to Embodiment 9 of the present invention. As shown in FIG. 10, the user equipment may include a determining module 901, a sending module 902, and a measuring module 903.

Specifically, the determining module 901 is configured to: when it is determined that signal quality of an intra-frequency cell meets standard information of a signal measurement report of the intra-frequency cell, determine that the user equipment is in proximity to an inter-frequency neighboring cell; or configured to: when it is determined that signal quality of an inter-frequency neighboring cell at a current position of the user equipment falls within a preset range, determine that the user equipment is in proximity to the inter-frequency neighboring cell; or configured to: when it is determined that a distance between a current position of the user equipment and a neighboring base station falls within a preset range, determine that the user equipment is in proximity to an inter-frequency neighboring cell.

The sending module 902 may be configured to send instruction information for activating measurement in an inter-frequency compressed mode to a radio network controller, where the instruction information for activating measurement in an inter-frequency compressed mode is used to instruct the radio network controller to activate a configuration of an inter-frequency compressed mode of a base station.

The measuring module 903 may be configured to perform measurement on the inter-frequency neighboring cell in a manner of measurement in an inter-frequency compressed mode.

The sending module 902 is further configured to report an inter-frequency measurement result to the radio network controller.

The user equipment in this embodiment may be configured to execute the technical solution of the method embodiment shown in FIG. 5, and the implementation principles and technical effects of the user equipment are similar and are not described herein again.

On the basis of the foregoing embodiment, optionally, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

Further, on the basis of the foregoing embodiment, the user equipment further includes the following:

a receiving module 904, which may be configured to receive configuration information that is of the inter-frequency compressed mode and sent by the radio network controller.

Optionally, the receiving module 904 may further be configured to receive a response message that is from the radio network controller and with respect to the instruction information for activating measurement in an inter-frequency compressed mode.

The user equipment in this embodiment may be configured to execute the technical solutions of the method embodiments shown in FIG. 5 and FIG. 7, and the implementation principles and technical effects of the user equipment are similar and are not described herein again.

Figure 11:
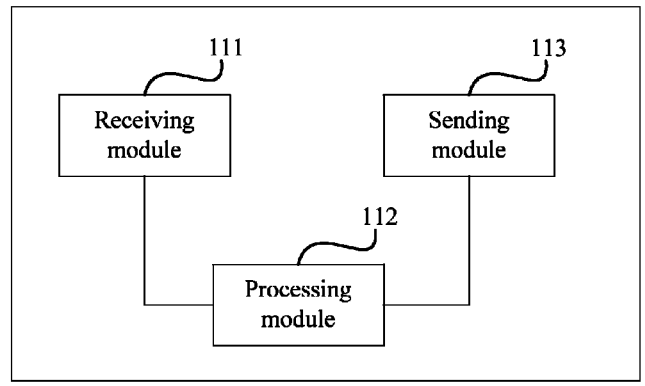
FIG. 11 is a schematic structural diagram of a radio network controller according to Embodiment 10 of the present invention.

FIG. 11 is a schematic structural diagram of a radio network controller according to Embodiment 10 of the present invention. As shown in FIG. 11, the radio network controller may include a receiving module 111 and a processing module 112.

Specifically, the receiving module 111 may be configured to receive instruction information that is sent by user equipment and for activating measurement in an inter-frequency compressed mode, where the instruction information for activating measurement in an inter-frequency compressed mode is used to instruct the radio network controller to activate a configuration of an inter-frequency compressed mode of a base station.

The processing module 112 may be configured to activate the configuration of the compressed mode according to the instruction information for activating measurement in an inter-frequency compressed mode.

The receiving module 111 may further be configured to receive an inter-frequency measurement result of measurement performed on an inter-frequency neighboring cell by the user equipment in a manner of measurement in an inter-frequency compressed mode.

The radio network controller in this embodiment may be configured to execute the technical solution of the method embodiment shown in FIG. 6, and the implementation principles and technical effects of the radio network controller are similar and are not described herein again.

On the basis of the foregoing embodiment, further, the radio network controller may further include:

a sending module 113, which may be configured to send configuration information of the inter-frequency compressed mode to the user equipment.

Optionally, the sending module 113 may further be configured to send the user equipment a response message with respect to the instruction information for activating measurement in an inter-frequency compressed mode.

On the basis of the foregoing embodiment, optionally, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

The radio network controller in this embodiment may be configured to execute the technical solutions of the method embodiments shown in FIG. 6 and FIG. 7, and the implementation principles and technical effects of the radio network controller are similar and are not described herein again.

Figure 12:
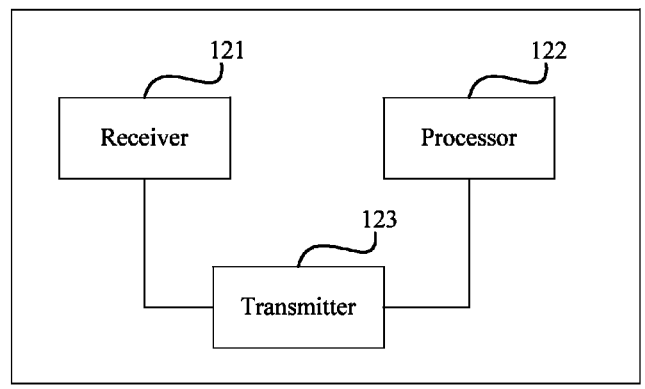
FIG. 12 is a schematic structural diagram of user equipment according to Embodiment 11 of the present invention.

FIG. 12 is a schematic structural diagram of user equipment according to Embodiment 11 of the present invention. As shown in FIG. 12, the user equipment may include a receiver 121, a processor 122, and a transmitter 123.

Specifically, the receiver 121 may be configured to receive proximity detection information of an inter-frequency neighboring cell sent by a radio network controller, where the proximity detection information of the inter-frequency neighboring cell is used to indicate standard information of a signal measurement report of an intra-frequency cell.

The processor 122 may be configured to perform signal measurement on the intra-frequency cell.

The transmitter 123 may be configured to: when signal quality of the intra-frequency cell meets the standard information of the signal measurement report of the intra-frequency cell, report an indication message to the radio network controller, where the indication message is used to indicate that the user equipment is in proximity to the inter-frequency neighboring cell.

The user equipment in this embodiment may be configured to execute the technical solution of the method embodiment shown in FIG. 1, and the implementation principles and technical effects of the user equipment are similar and are not described herein again.

On the basis of the foregoing embodiment, optionally, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

Optionally, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

The user equipment in this embodiment may be configured to execute the technical solution of the method embodiment shown in FIG. 3 and FIG. 4, and the implementation principles and technical effects of the user equipment are similar and are not described herein again.

Figure 13:
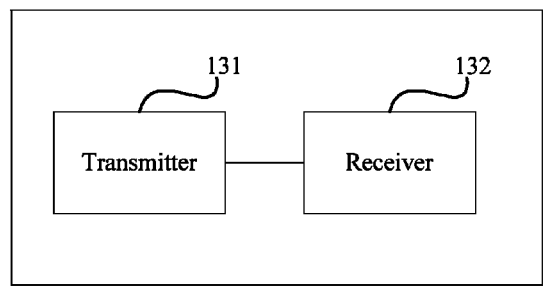
FIG. 13 is a schematic structural diagram of a radio network controller according to Embodiment 12 of the present invention.

FIG. 13 is a schematic structural diagram of a radio network controller according to Embodiment 12 of the present invention. As shown in FIG. 13, the radio network controller may include a transmitter 131 and a receiver 132.

Specifically, the transmitter 131 may be configured to send proximity detection information of an inter-frequency neighboring cell to user equipment, where the proximity detection information of the inter-frequency neighboring cell is used to indicate standard information of a signal measurement report of an intra-frequency cell, so that the user equipment performs signal measurement on the intra-frequency cell.

The receiver 132 may be configured to receive an indication message sent by the user equipment when signal quality of the intra-frequency cell meets the standard information of the signal measurement report of the intra-frequency cell, where the indication message is used to indicate that the user equipment is in proximity to the inter-frequency neighboring cell.

The radio network controller in this embodiment may be configured to execute the technical solution of the method embodiment shown in FIG. 2, and the implementation principles and technical effects of the radio network controller are similar and are not described herein again.

On the basis of the foregoing embodiment, optionally, the standard information of the signal measurement report of the intra-frequency cell includes at least one piece of the following information: threshold information that needs to be met by the signal quality of the intra-frequency cell, hysteresis information that needs to be met by the signal quality of the intra-frequency cell, and duration information that is of a measurement report standard and needs to be met by the signal quality of the intra-frequency cell.

Optionally, the signal quality that meets the standard information of the signal measurement report of the intra-frequency cell is expressed by using at least one of signal quality signal-to-noise ratio information, signal strength information, and path loss information that are of the intra-frequency cell, or is expressed by using at least one of signal quality signal-to-noise ratio difference information, signal strength difference information, and path loss difference information that are of any two intra-frequency cells.

The radio network controller in this embodiment may be configured to execute the technical solution of the method embodiment shown in FIG. 3 and FIG. 4, and the implementation principles and technical effects of the radio network controller are similar and are not described herein again.

Figure 14:
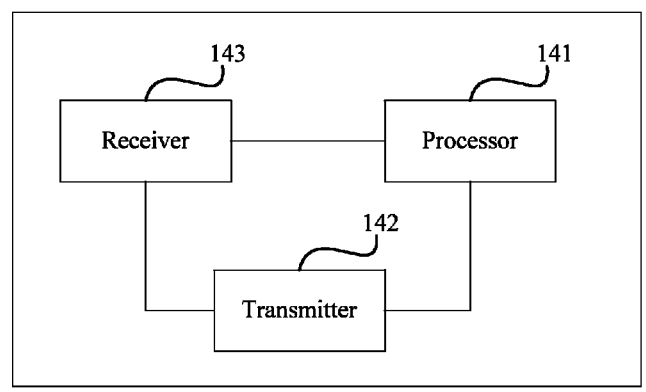
FIG. 14 is a schematic structural diagram of user equipment according to Embodiment 13 of the present invention.

FIG. 14 is a schematic structural diagram of user equipment according to Embodiment 13 of the present invention. As shown in FIG. 14, the user equipment may include a processor 141 and a transmitter 142.

The processor 141 is configured to: when it is determined that signal quality of an intra-frequency cell meets standard information of a signal measurement report of the intra-frequency cell, determine that the user equipment is in proximity to an inter-frequency neighboring cell; or configured to: when it is determined that signal quality of an inter-frequency neighboring cell at a current position of the user equipment falls within a preset range, determine that the user equipment is in proximity to the inter-frequency neighboring cell; or configured to: when it is determined that a distance between a current position of the user equipment and a neighboring base station falls within a preset range, determine that the user equipment is in proximity to an inter-frequency neighboring cell.

The transmitter 142 may be configured to send instruction information for activating measurement in an inter-frequency compressed mode to a radio network controller, where the instruction information for activating measurement in an inter-frequency compressed mode is used to instruct the radio network controller to activate a configuration of an inter-frequency compressed mode of a base station.

The processor 141 may further be configured to perform measurement on the inter-frequency neighboring cell in a manner of measurement in an inter-frequency compressed mode.

The transmitter 142 may further be configured to report an inter-frequency measurement result to the radio network controller.

The user equipment in this embodiment may be configured to execute the technical solution of the method embodiment shown in FIG. 5, and the implementation principles and technical effects of the user equipment are similar and are not described herein again.

On the basis of the foregoing embodiment, optionally, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

Further, on the basis of the foregoing embodiment, the user equipment may further include:

a receiver 143, which may be configured to receive configuration information that is of the inter-frequency compressed mode and sent by the radio network controller.

Optionally, the receiver 143 may further be configured to receive a response message that is from the radio network controller and with respect to the instruction information for activating measurement in an inter-frequency compressed mode.

The user equipment in this embodiment may be configured to execute the technical solutions of the method embodiments shown in FIG. 5 and FIG. 7, and the implementation principles and technical effects of the user equipment are similar and are not described herein again.

Figure 15:
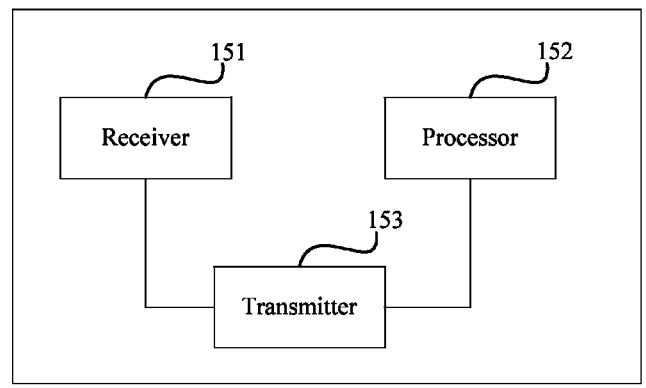
FIG. 15 is a schematic structural diagram of a radio network controller according to Embodiment 14 of the present invention.

FIG. 15 is a schematic structural diagram of a radio network controller according to Embodiment 14 of the present invention. As shown in FIG. 15, the radio network controller may include a receiver 151 and a processor 152.

Specifically, the receiver 151 may be configured to receive instruction information that is sent by user equipment and for activating measurement in an inter-frequency compressed mode, where the instruction information for activating measurement in an inter-frequency compressed mode is used to instruct the radio network controller to activate a configuration of an inter-frequency compressed mode of a base station.

The processor 152 may be configured to activate the configuration of the compressed mode according to the instruction information for activating measurement in an inter-frequency compressed mode.

The receiver 151 may further be configured to receive an inter-frequency measurement result of measurement performed on an inter-frequency neighboring cell by the user equipment in a manner of measurement in an inter-frequency compressed mode.

The radio network controller in this embodiment may be configured to execute the technical solution of the method embodiment shown in FIG. 6, and the implementation principles and technical effects of the radio network controller are similar and are not described herein again.

On the basis of the foregoing embodiment, further, the radio network controller may further include a transmitter 153, which may be configured to send configuration information of the inter-frequency compressed mode to the user equipment.

Optionally, the transmitter 153 may further be configured to send the user equipment a response message with respect to the instruction information for activating measurement in an inter-frequency compressed mode.

Optionally, the instruction information for activating measurement in an inter-frequency compressed mode includes a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of the first transmission gap slot, a slot length of the first transmission gap slot, a slot length of a distance between the second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

The radio network controller in this embodiment may be configured to execute the technical solutions of the method embodiments shown in FIG. 6 and FIG. 7, and the implementation principles and technical effects of the radio network controller are similar and are not described herein again.

Persons of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for measuring an inter-frequency neighboring cell, comprising:
   determining, by a user equipment, that the user equipment is in proximity to an inter-frequency neighboring cell, wherein the user equipment determines it is in proximity to the inter-frequency neighboring cell by measuring a signal of an intra-frequency cell;

in response to determining that the user equipment is in proximity to the inter-frequency neighboring cell, sending, by the user equipment, instruction information for activating measurement in an inter-frequency compressed mode to a radio network controller, wherein the instruction information for activating measurement in an inter-frequency compressed mode is used to instruct the radio network controller to activate a configuration of an inter-frequency compressed mode of a base station;

performing, by the user equipment, measurement on an inter-frequency neighboring cell in a manner of measurement in an inter-frequency compressed mode; and reporting, by the user equipment, an inter-frequency measurement result to the radio network controller.

2. The method according to claim 1, wherein the instruction information for activating measurement in an inter-frequency compressed mode comprises a number of a frame in which measurement in a compressed mode is activated, and at least one of the following configuration parameters of an inter-frequency compressed mode: a transmission gap pattern sequence identity, a transmission gap pattern repetition count, a transmission gap measurement purpose, a slot number of a first transmission gap slot, a slot length of the first transmission gap slot, a slot length of a distance between a second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

3. The method according to claim 1, further comprising:
receiving, by the user equipment, configuration information that is of the inter-frequency compressed mode and sent by the radio network controller.

4. The method according to claim 1, further comprising:
receiving, by the user equipment, a response message from the radio network controller with respect to the instruction information for activating measurement in an inter-frequency compressed mode.

5. A method for measuring an inter-frequency neighboring cell, comprising:
receiving, by a radio network controller from a user equipment, instruction information for activating measurement in an inter-frequency compressed mode, wherein the instruction information for activating measurement in an inter-frequency compressed mode instructs the radio network controller to activate a configuration of an inter-frequency compressed mode of a base station, and wherein the user equipment sends the instruction information to the radio network controller in response to determining, by the user equipment according to a measurement of a signal of an intra-frequency cell, that the user equipment is in proximity to an inter-frequency neighboring cell;

activating, by the radio network controller, the configuration of the compressed mode of the base station according to the instruction information for activating measurement in an inter-frequency compressed mode; and receiving, by the radio network controller, an inter-frequency measurement result of measurement performed on the inter-frequency neighboring cell by the user equipment in a manner of measurement in an inter-frequency compressed mode.

6. The method according to claim 5, further comprising:
sending, by the radio network controller, configuration information of the inter-frequency compressed mode to the user equipment.

7. The method according to claim 5, wherein the instruction information for activating measurement in an inter-frequency compressed mode comprises a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of a first transmission gap slot, a slot length of the first transmission gap slot, a slot length of a distance between a second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

8. A user equipment, comprising:
a processor, configured to determine, by measuring a signal of an intra-frequency cell, that the user equipment is in proximity to an inter-frequency neighboring cell; and a transmitter, configured to send, in response to determining that the user equipment is in proximity to the inter-frequency cell, instruction information for activating measurement in an inter-frequency compressed mode to a radio network controller, wherein the instruction information for activating measurement in an inter-frequency compressed mode is used to instruct the radio network controller to activate a configuration of an inter-frequency compressed mode of a base station;

wherein the processor is further configured to perform measurement on an inter-frequency neighboring cell in a manner of measurement in an inter-frequency compressed mode; and further configured to report an inter-frequency measurement result to the radio network controller.

9. The user equipment according to claim 8, wherein the instruction information for activating measurement in an inter-frequency compressed mode comprises a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of a first transmission gap slot, a slot length of the first transmission gap slot, a slot length of a distance between a second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

10. The user equipment according to claim 8, further comprising:
a receiver, configured to receive configuration information that is of the inter-frequency compressed mode and sent by the radio network controller.

11. The user equipment according to claim 8, further comprising a receiver, wherein the receiver is further configured to receive a response message from the radio network controller with respect to the instruction information for activating measurement in an inter-frequency compressed mode.

12. A radio network controller, comprising:
a receiver, configured to receive instruction information that is sent by a user equipment for activating measurement in an inter-frequency compressed mode, wherein the instruction information for activating measurement in an inter-frequency compressed mode instructs the radio network controller to activate a configuration of an inter-frequency compressed mode of a base station, and wherein the user equipment sends the instruction information to the radio network controller in response to determining, by the user equipment according to a measurement of a signal of an intra-frequency cell, that the user equipment is in proximity to an inter-frequency neighboring cell; and
a processor, configured to activate the configuration of the compressed mode according to the instruction information for activating measurement in an inter-frequency compressed mode;
wherein the receiver is further configured to receive an inter-frequency measurement result of measurement performed on the inter-frequency neighboring cell by the user equipment in a manner of measurement in an inter-frequency compressed mode.

13. The radio network controller according to claim 12, further comprising:
a transmitter, configured to send configuration information of the inter-frequency compressed mode to the user equipment.

14. The radio network controller according to claim 12, wherein the instruction information for activating measurement in an inter-frequency compressed mode comprises a number of a frame in which a compressed mode is activated and at least one of the following configuration parameters of an inter-frequency compressed mode: a transmission gap pattern sequence identity, a transmission gap pattern repetition count, a transmission gap measurement purpose, a slot number of a first transmission gap slot, a slot length of the first transmission gap slot, a slot length of a distance between a second transmission gap slot and the first transmission gap slot, a slot length of the second transmission gap slot, duration of a transmission gap pattern, a recovery period power control mode, an initial transmit power calculation mode, an uplink compressed mode, a downlink compressed mode, a downlink frame type, and a power control parameter.

* * * * *